US011629836B2

(12) United States Patent
Inoue et al.

(10) Patent No.: US 11,629,836 B2
(45) Date of Patent: Apr. 18, 2023

(54) HEADLAMP CONTROL SYSTEM

(71) Applicant: HONDA MOTOR CO., LTD., Tokyo (JP)

(72) Inventors: Naoto Inoue, Tokyo (JP); Ryuichi Nakano, Tokyo (JP); Masayoshi Takori, Wako (JP); Go Shimizu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/679,402

(22) Filed: Feb. 24, 2022

(65) Prior Publication Data

US 2022/0282847 A1 Sep. 8, 2022

(30) Foreign Application Priority Data

Mar. 3, 2021 (JP) .............................. JP2021-033786

(51) Int. Cl.
*F21S 41/663* (2018.01)
*F21W 102/13* (2018.01)
(52) U.S. Cl.
CPC ........ *F21S 41/663* (2018.01); *F21W 2102/13* (2018.01)

(58) Field of Classification Search
CPC ....... B60Q 1/10; B60Q 1/0023; F21S 41/141; F21S 41/153; F21S 41/151
See application file for complete search history.

(56) References Cited

U.S. PATENT DOCUMENTS

2021/0237819 A1\* 8/2021 Horn ........................ B60Q 1/12

FOREIGN PATENT DOCUMENTS

JP 2005-119463 A 5/2005

\* cited by examiner

*Primary Examiner* — Matthew J. Peerce
(74) *Attorney, Agent, or Firm* — Rankin, Hill & Clark LLP

(57) ABSTRACT

A headlamp control system includes: a headlamp that emits light toward a forward direction of a vehicle; a tilt detection part; and a control part. The headlamp includes: high beam emitting parts that respectively illuminate plural high beam areas arrayed in a left-right direction; and a low beam emitting part that illuminates a low beam area located at a lower position than the plural high beam areas. The control part, in a state where the low beam emitting part is on, when the tilt detection part detects that the vehicle has tilted such that one of left and right sides of the vehicle is lowered than the other one of the left and right sides, controls the high beam emitting parts so as to illuminate at least one of the plural high beam areas, the at least one being on the one of the left and right sides.

4 Claims, 11 Drawing Sheets

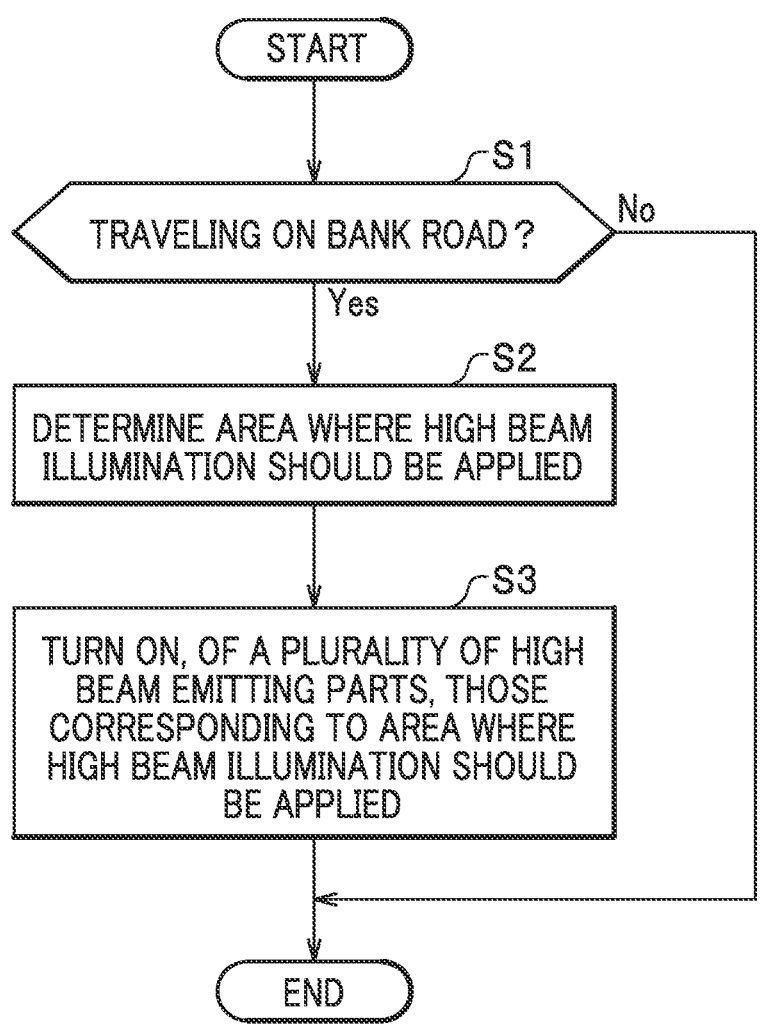

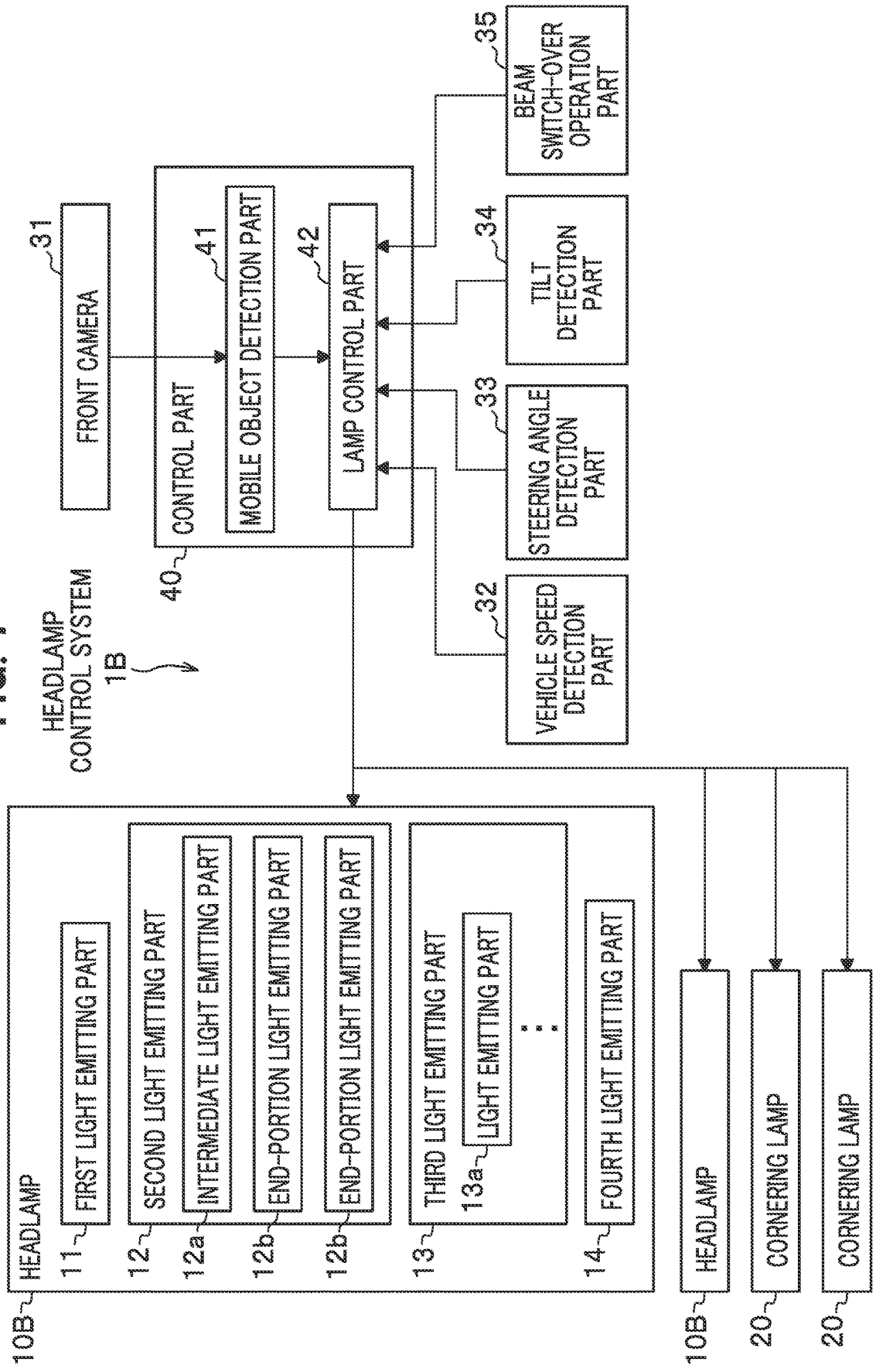

HEADLAMP CONTROL SYSTEM

CROSS-REFERENCE TO RELATED APPLICATIONS

The present application claims the foreign priority benefit under Title 35 U.S.C. § 119 of Japanese Patent Application No. 2021-033786, filed on Mar. 3, 2021, in the Japan Patent Office, the disclosure of which is herein incorporated by reference in its entirety.

BACKGROUND OF THE INVENTION

1. Field of the Invention

The present invention relates to a headlamp control system

2. Description of Related Art

Japanese Patent Publication No. 2005-119463 (hereinafter referred to as Patent Literature 1) discloses that a vehicle traveling on a slope mountain road controls a headlamp to illuminate the road ahead of a curve by rotating the headlamp.

The technique described in Patent Literature 1 requires a turn table and a support member that rotatably support the headlamp, and requires a motor to rotate the headlamp.

SUMMARY

The present invention has been made in view of the above-described circumstance and it is an object of the present invention to provide a headlamp control system capable of improving the visibility in a low beam distribution state while traveling on a bank road, with a simple configuration.

To achieve the above-described object, a headlamp control system of an embodiment according to the present invention includes: a headlamp configured to emit light toward a forward direction of a vehicle; a tilt detection part configured to detect a tilt of the vehicle toward a left direction and a tilt of the vehicle toward a right direction; and a control part configured to control the headlamp. The headlamp includes: high beam emitting parts configured to respectively illuminate a plurality of high beam areas into which a high beam area is segmented in a left-right direction; and a low beam emitting part configured to illuminate a low beam area located at a lower position than the plurality of high beam areas. The control part is configured to, in a state in which the low beam emitting part is on, when the tilt detection part detects that the vehicle has tilted such that one of a left side and a right side of the vehicle is lowered than the other one of the left side and the right side of the vehicle, control the high beam emitting parts so as to illuminate at least one high beam area of the plurality of high beam areas, the at least one high beam area being on the one of the left side and the right side of the vehicle.

The present invention makes it possible to, with a simple configuration, improve visibility in a low beam distribution state in the event of traveling on a bank road.

BRIEF DESCRIPTION OF THE DRAWINGS

FIG. 6 is a flowchart for explaining an example of the operation of the headlamp control system of the first embodiment according to the present invention.

FIG. 7 is a block diagram schematically illustrating a headlamp control system of a second embodiment according to the present invention.

DETAILED DESCRIPTION OF EMBODIMENTS

Embodiments of the present invention will be described in detail below with reference to the drawings as appropriate. Note that, basically, constituent elements having the same function are denoted by the same reference sign and duplicated description will be omitted. The terms representing directions, such as up-down, front-rear, left-right (vehicle-width direction), are defined with respect to a passenger (driver) of the vehicle.

First Embodiment

Figure 1:
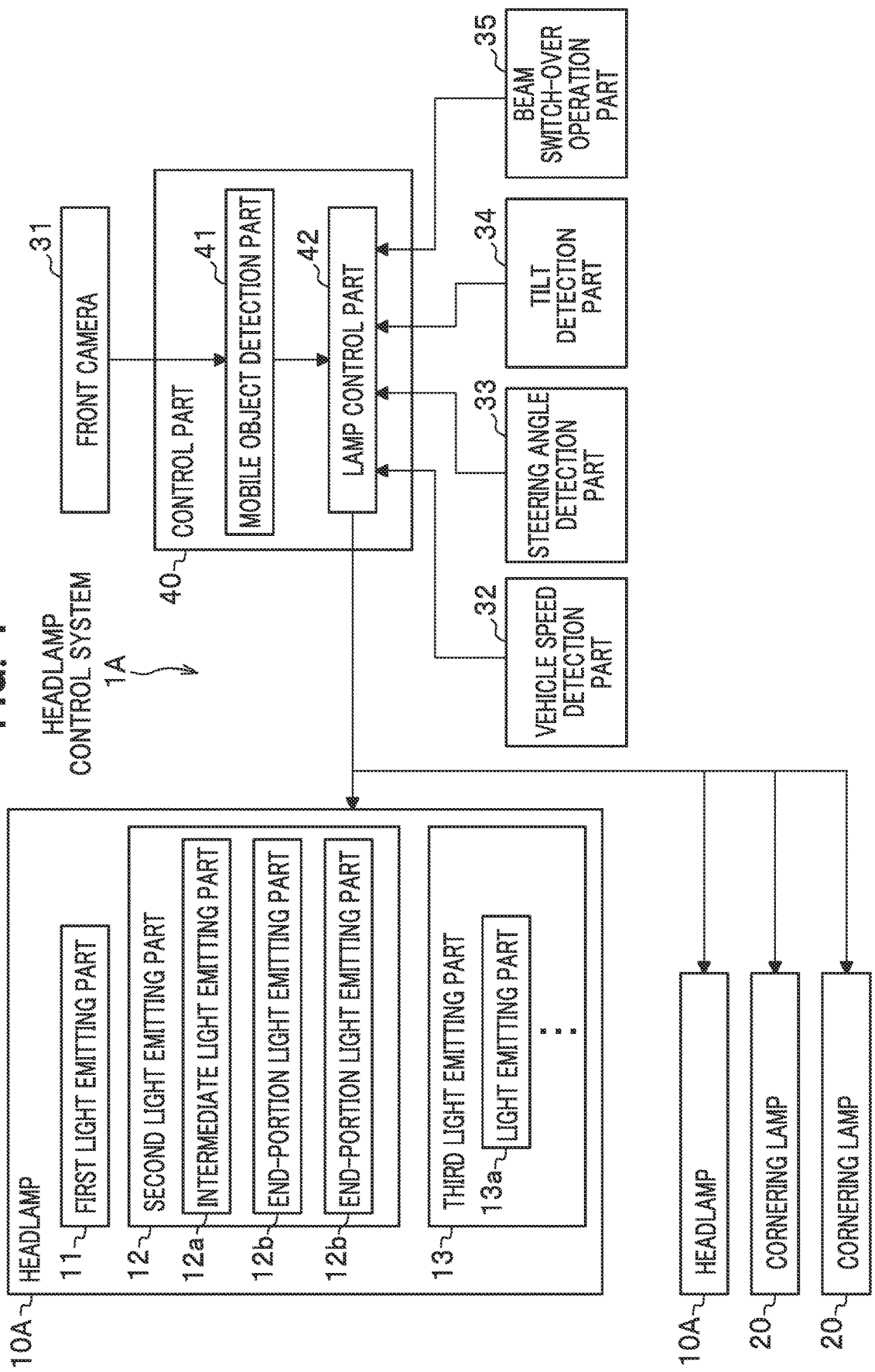
FIG. 1 is a block diagram schematically illustrating a headlamp control system of a first embodiment according to the present invention.

As illustrated in FIG. 1, a headlamp control system 1A of a first embodiment according to the present invention includes: a left-right pair of headlamps 10A; a left-right pair of cornering lamps 20; a front camera 31; a vehicle speed detection part 32; a steering angle detection part 33; a tilt detection part 34; a beam switch-over operation part 35; and a control part 40.

<Headlamp>

The headlamps 10A are controlled by the control part 40 according to operations or the like of the driver, to emit light toward the forward direction of the vehicle C1. Each of the headlamps 10A is of the multi-eye type that includes a plurality of light emitting parts. Each of the plurality of light emitting parts includes a light emitting diode(s) (LED) and an optical surface such as a reflection plate disposed to cover the LED of the light emitting part from the rear thereof and to partition off the light emitting parts. The headlamps 10A each include: a first light emitting part 11 and a second light emitting part 12, each serving as a low beam emitting part; and a third light emitting part 13 serving as a high beam emitting part.

<<First Light Emitting Part>>

Figure 2:
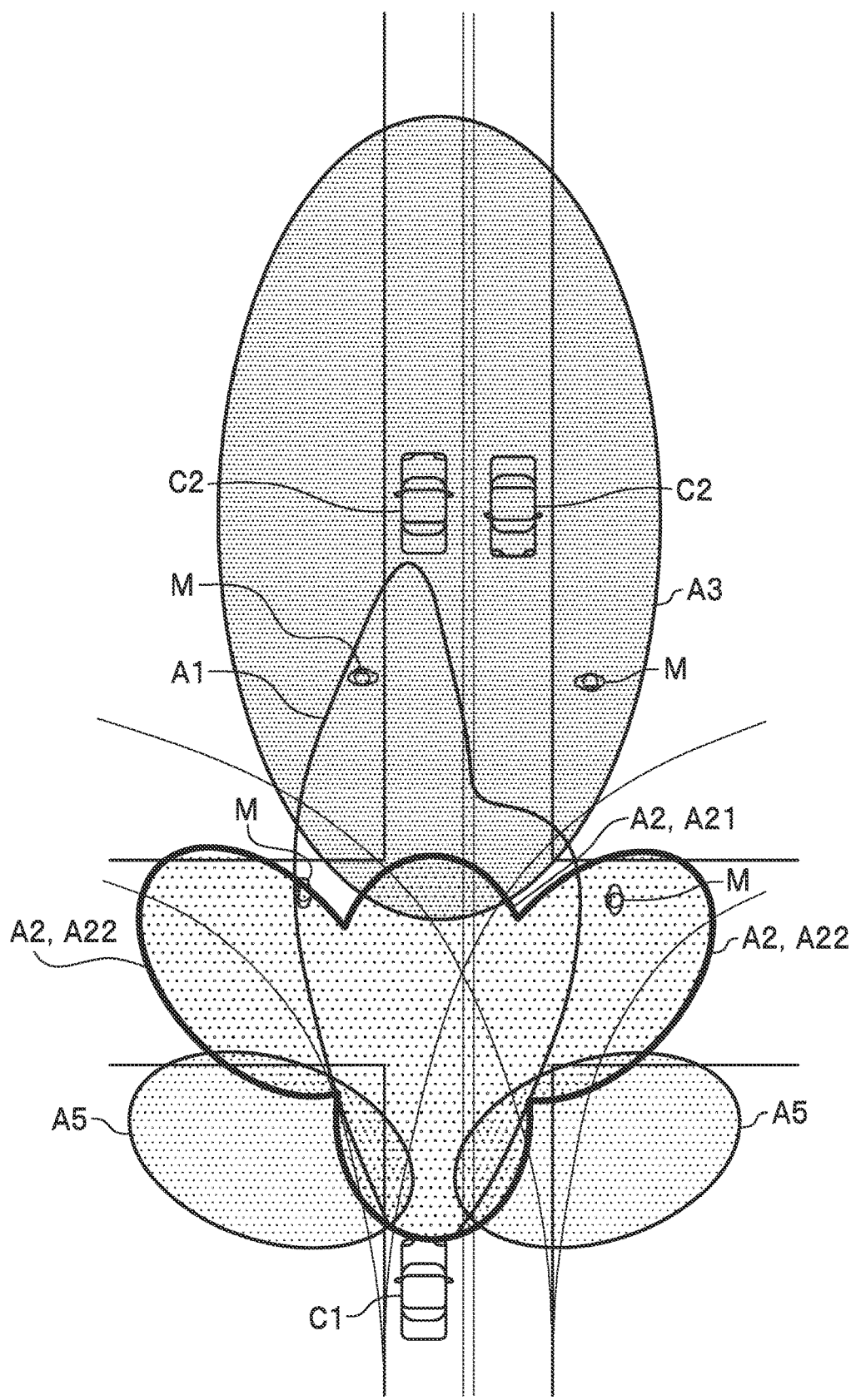
FIG. 2 is a diagram schematically illustrating an example of illumination areas illuminated by the headlamps of a vehicle to which the headlamp control system of the first embodiment according to the present invention is applied.
Figure 3:
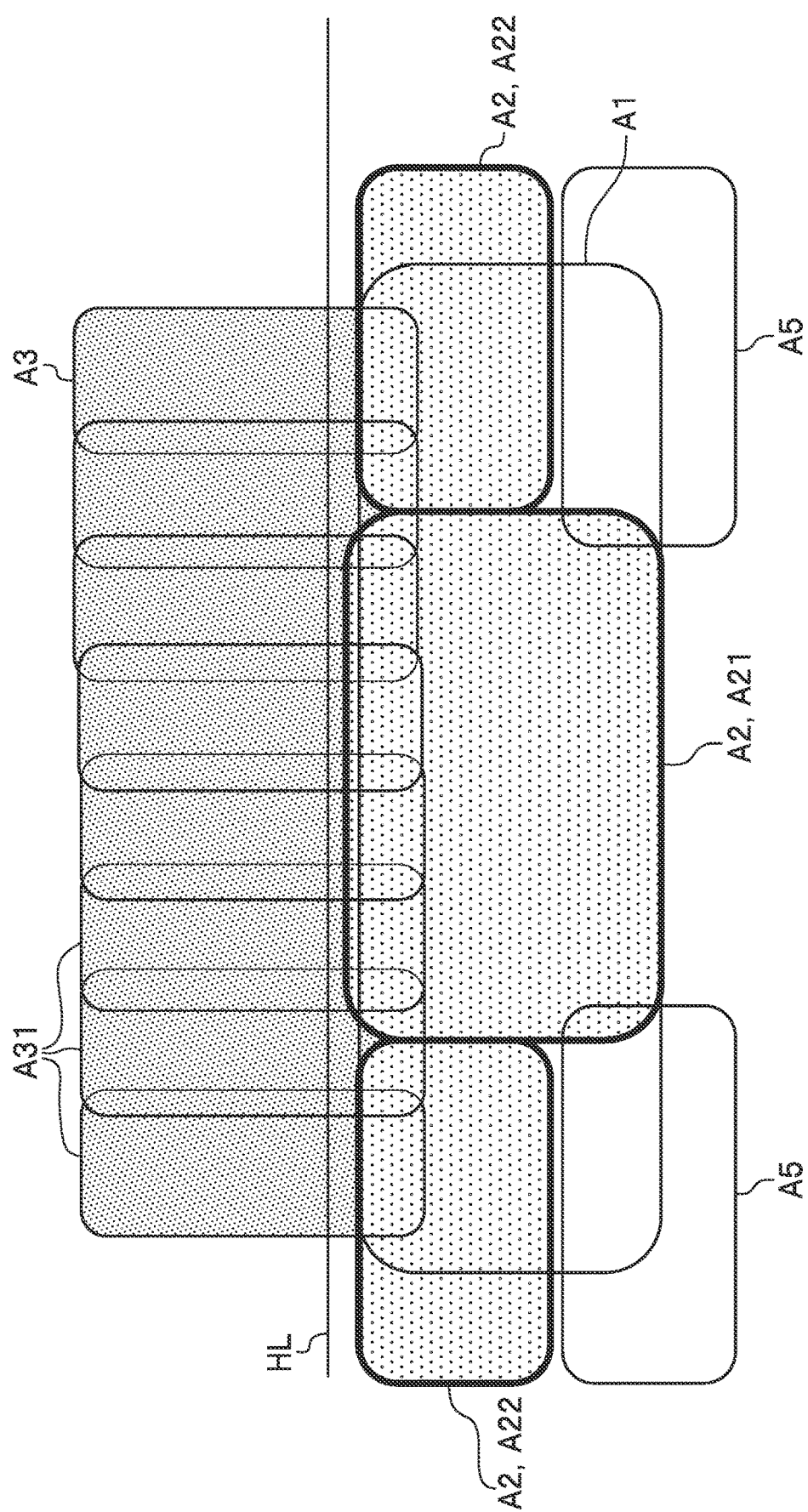
FIG. 3 is another diagram schematically illustrating an example of illumination areas illuminated by the headlamps of the vehicle to which the headlamp control system of the first embodiment according to the present invention is applied.

The first light emitting part 11 is a first low beam emitting part configured to emit light toward the forward direction of the vehicle C1 to an area (see illumination area (low beam area) A1 illustrated in FIGS. 2 and 3) whose width is relatively narrow. The first light emitting part 11 is configured to direct light emitted from the LED(s) to the illumination area A1, located under the parallel line, by the optical surfaces. Note that in FIG. 3, the vertical axis corresponds to the up-down directions and the horizontal axis corresponds to the left-right directions (vehicle-width directions). The parallel line HL corresponds to a virtual plane extending through the headlamps 10 in parallel to the road surface.

<<Second Light Emitting Part>>

The second light emitting part 12 is a second low beam emitting part configured to emit light toward the forward direction of the vehicle C1 to an area (see illumination area (second area) A2 illustrated in FIGS. 2 and 3) whose width in the vehicle-width directions is wide compared to the first light emitting part 11. The second area A2 includes the first area A1 and has a wider width in the vehicle-width directions than the first area. The second light emitting part 12 is configured to direct light emitted from LEDs, which are equivalent to those of the first light emitting part 11, to the illumination area A2, located under the parallel line HL, by the optical surfaces.

The second light emitting part 12 includes an intermediate light emitting part 12a and a left-right pair of end portion light emitting parts 12b. The intermediate light emitting part 12a is configured to emit light to a width-direction intermediate portion A21 of the illumination area A2. The width-direction intermediate portion A21 is positioned to overlap with a width-direction intermediate portion of the illumination area A1. The end portion light emitting parts 12b are configured to emit light respectively to width-direction end portions A22 of the illumination area A2. The width-direction end portions A22 overlap with upper portions of width-direction end portions of the illumination area A1 and each extend further than the illumination area A1 outward in the corresponding width direction. As described, the illumination area A1 illuminated by the first light emitting part 11 is divided into three areas in the width direction (width-direction intermediate portion and the pair of width-direction end portions). The intermediate light emitting part 12a serves to increase the amount of light in the width-direction intermediate portion of the illumination area A1; and the end portion light emitting parts 12b serve to increase the amount of light in the width-direction end portions of the illumination area A1.

<<Third Light Emitting Part>>

The third light emitting part 13 is a first high beam emitting part configured to emit light toward the forward direction of the vehicle C1 mainly to an area above the parallel line HL. More specifically, the headlamp 10 turns on the third light emitting part 13 to emit light as a high beam to an area which includes the vicinity of the parallel line HL and most of which is above the parallel line HL. See the illumination area (third area/high beam area) A3 illustrated in FIGS. 2 and 3. The third light emitting part 13 includes a plurality of light emitting parts 13a. Each of the plurality of light emitting parts 13a emits light to, of the third area A3, one of segmented areas into which the third area A3 is segmented in the left-right direction. In other words, the third area A3 is segmented into a plurality of segments in the left-right direction; and the plurality of light emitting parts 13a are arrayed in the left-right direction. The plurality of light emitting parts 13a each correspond to, of the third area A3, one of the segmented areas A31 into which the third area A3 is segmented in the left-right direction.

<Cornering Lamp>

The cornering lamps 20 are each a light emitting part configured to emit light to an illumination area (fifth area) A5 (see FIGS. 2 and 3) located in a diagonally forward direction of the vehicle C1. Incidentally, note that the fourth illumination area A4 is described later in the description of the second embodiment. The fifth areas A5 each overlap with a lower portion of a corresponding width-direction end portion of the illumination area A1 and extend further than the illumination area A1 outward in the corresponding width direction and downward (i.e., toward the vicinity of the vehicle C1).

<Front Camera>

As illustrated in FIG. 2, the front camera (e.g., stereo camera) 31 captures an image of the view ahead of the vehicle C1 and outputs the image capture result to the control part 40. The front camera 31 is a part of a mobile object detection part configured to detect mobile objects present ahead of the vehicle C1. As the front camera 31 serving as a part of the mobile object detection part, a camera other than stereo cameras may be used.

<Vehicle Speed Detection Part>

The vehicle speed detection part 32 is a sensor configured to detect the vehicle speed (vehicle body speed) of the vehicle C1 and to output the detection result to the control part 40.

<Steering Angle Detection Part>

The steering angle detection part 33 is a sensor configured to detect a steering wheel angle of the vehicle C1 or a turning angle of the turning wheels of the vehicle C1 and to output the detection result to the control part 40.

<Tilt Detection Part>

The tilt detection part 34 is a sensor configured to detect a left-right direction tilt (longitudinal-axis rotation) of the vehicle C1 and a front-rear direction tilt (lateral-axis rotation) of the vehicle C1 and to output the detection result to the control part 40. For example, at a left curve, as the bank angle along the transverse direction of the road is set such that the left side of the road is lower than the right side of the road, a vehicle C1 traveling on a left curve has tilted such that the left side of the vehicle C1 is at a lower position than the right side of the vehicle C1 according to the bank angle. The tilt detection part 34 is configured to detect the left-right direction tilt (tilt angle), due to the bank angle, of the vehicle C1 traveling on a curve.

<Beam Switch Operation Part>

The beam switch-over operation part 35 allows the driver to operate to switch between low beam and high beam of the headlamps 10A and is configured to output information indicative of the operation of the driver to the control part 40.

<Control Part>

The control part 40 is a so-called electrical control unit (ECU) including a central processing unit (CPU), a read-only memory (ROM), and a random access memory (RAM). The control part 40 includes a mobile object detection part 41 and a lamp control part 42, as functional parts.

<<Mobile Object Detection Part>>

The mobile object detection part 41 is configured to receive the image capture result of the front camera 31 and detect (extract) mobile objects M (opposing vehicles C2, bicycles, pedestrians, and the like) from the received image capture result. The mobile object detection part 41 outputs the detection (extraction) result to the lamp control part 42. In addition, the mobile object detection part 41 measures (calculates) the distances from the vehicle C1 to the detected mobile objects M, based on the image capture result of the front camera 31, and outputs the measurement result to the lamp control part 42. Note that the mobile object detection part 41 is not limited to one extracting mobile objects M from the image capture result of the front camera 31. For example, the mobile object detection part 41 may be configured to detect mobile objects M (opposing vehicles C2) on the basis of a detection result of a radar emitting ultrasonic waves in the forward direction of the vehicle C1 and detecting reflected waves thereof or on the basis of a communication result of communication means that communicates positional information on the opposing vehicles C2. Further, the mobile object detection part 41 may be configured to detect mobile objects M by obtaining positional information on mobile terminals carried by the pedestrians. The mobile object detection part 41 may be configured to measure the distances from the vehicle C1 to the mobile objects M on the basis of the detection result (emission time and reception time) of the radar. The mobile object detection part 41 may be configured to detect mobile objects M and detect the distances to the mobile objects M by obtaining a detection result of a sensor detecting the mobile objects M and a detection result of a separate sensor detecting the distances to the mobile objects M.

The mobile object detection part 41 may be configured to determine whether a mobile object M is a human (pedestrian or human riding a bicycle) by using a contour extraction technique, face recognition technique, or the like. In this case, the lamp control part 42 may be configured to perform below-described control when the mobile object M is a human.

<<Lamp Control Part>>

The lamp control part 42 is configured to control the headlamps 10 and the cornering lamps 20. The lamp control part 42 turns on or off the headlamps 10 and the cornering lamps 20 according to operations or the like of the driver. The lamp control part 42 switches between low beam and high beam of the headlamps 10 according to the driver's operations on the beam switch-over operation part 35. Specifically, when low beam is selected, the lamp control part 42 turns on the first light emitting part 11 and as needed the second light emitting part 12 and turns off the third light emitting part 13; and when high beam is selected, the lamp control part 42 turns on the third light emitting part 13 and turns off the first light emitting part 11 and the second light emitting part 12.

Upon detection by the tilt detection part 34 that the vehicle C1 has tilted such that one of the left and right sides of the vehicle C1 is lower than the other one of the left and right sides of the vehicle C1 in a state in which the first light emitting part 11 is on, the lamp control part 42 turns on the third light emitting part 13 so as to illuminate, of the plurality of high beam areas (illumination areas A31), high beam area(s) on the one of the left and right sides of the vehicle C1.

The lamp control part 42 may be configured to determine the tilt of the vehicle C1 in a comprehensive manner on the basis of, in addition to the result of detection by the tilt detection part 34, a result of detection by an acceleration sensor provided in the vehicle C1 and a result of image capture by the front camera 31, for example.

<Low Beam Distribution Control Based on Left-Right Direction Tilt>

Hereinafter, a description will be given of low beam distribution control based on the left-right direction tilt of the vehicle C1. For this control, the lamp control part 42 controls the first light emitting part 11, the end portion light emitting parts 12b of the second light emitting part 12, and the third light emitting part 13. Specifically, the lamp control part 42 uses the third light emitting part 13, which is for high beam illumination, as an auxiliary for low beam illumination.

Figure 4A:
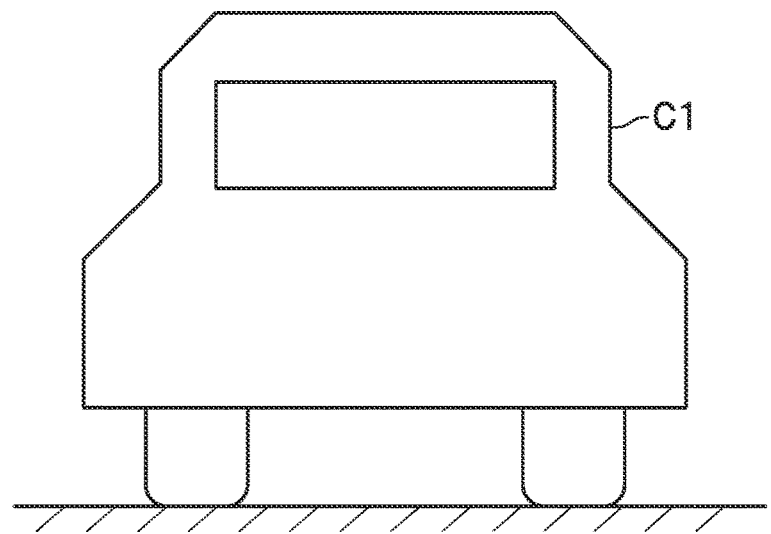
FIG. 4A is a diagram schematically illustrating a vehicle traveling on a straight road.
Figure 4B:
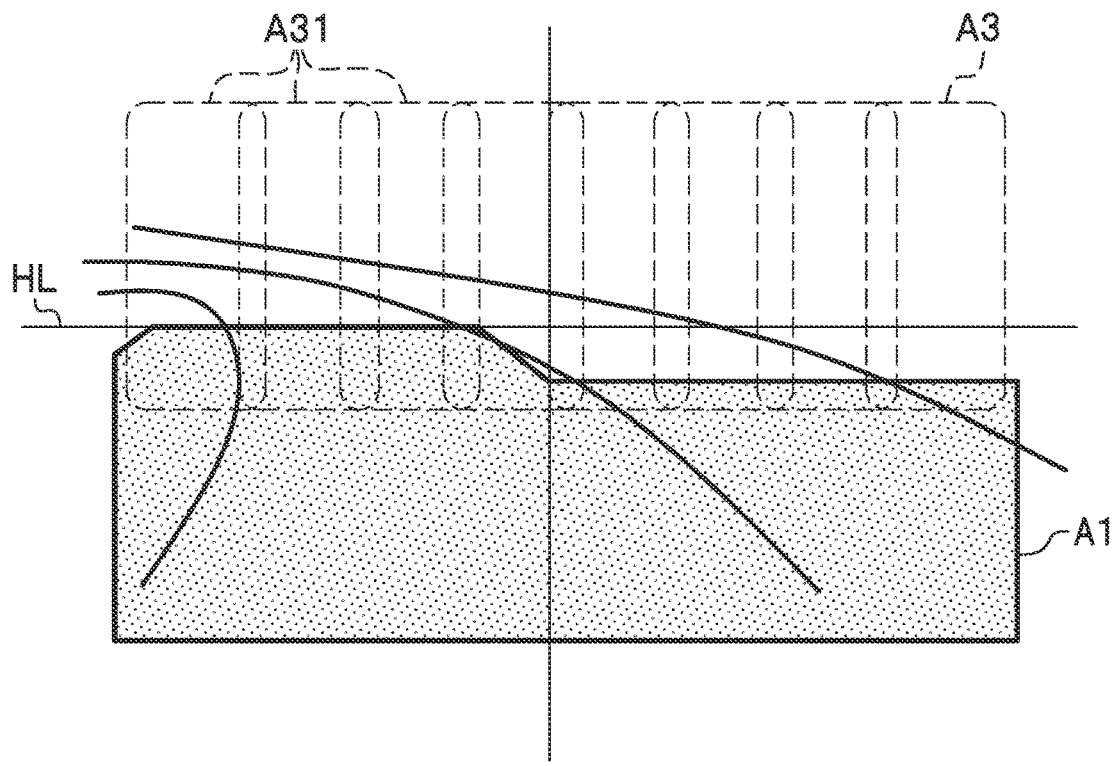
FIG. 4B is a diagram schematically illustrating an example of a low beam distribution state of the headlamps of the vehicle traveling on a straight road.

As illustrated in FIGS. 4A and 4B, the lamp control part 42, in a low beam distribution state, puts the first light emitting part 11 in a state of being on while the vehicle C1 is not inclined toward any of the left-right and front-rear directions. In this case, the second light emitting part 12 and the third light emitting part 13 are kept in a state of being off.

Figure 5A:
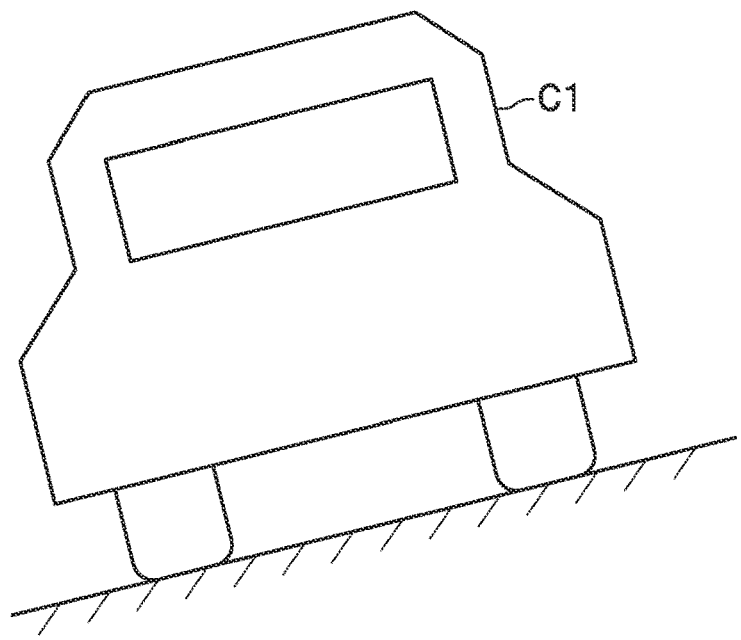
FIG. 5A is a diagram schematically illustrating a vehicle traveling on a bank road.
Figure 5B:
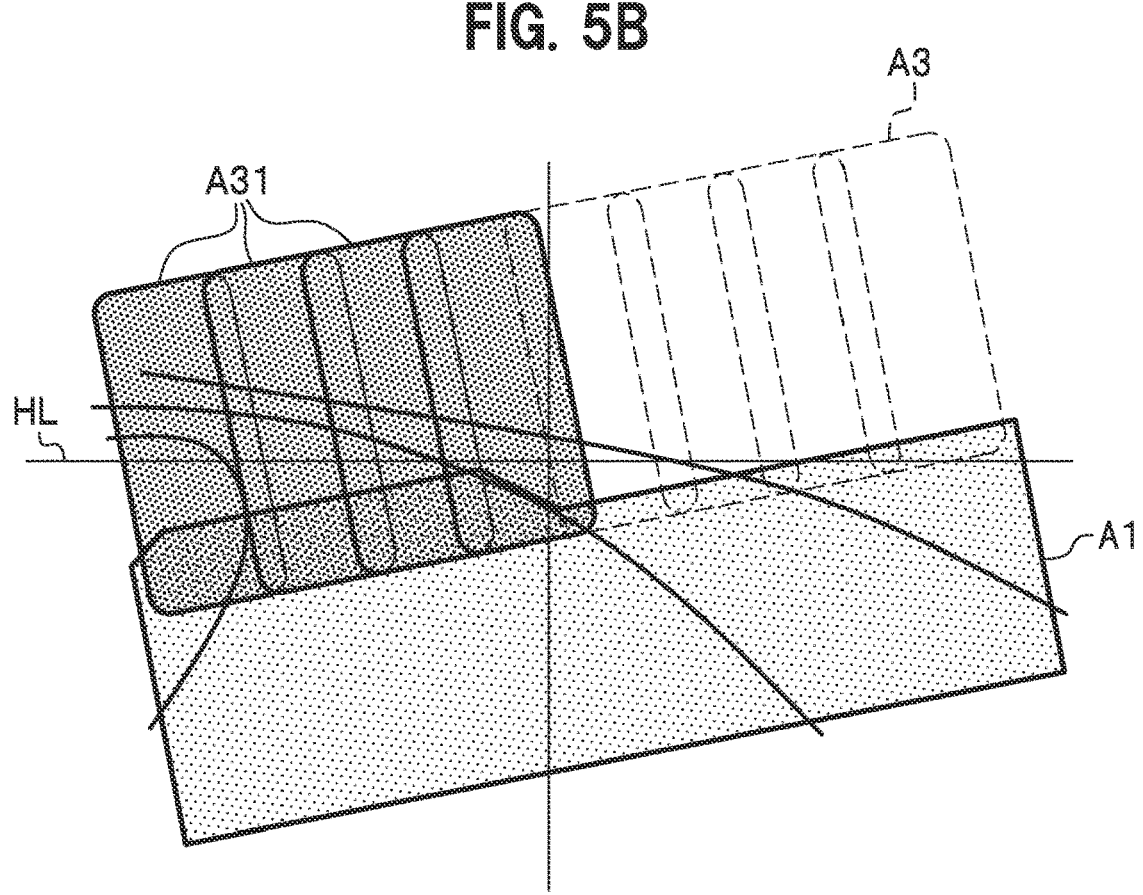
FIG. 5B is a diagram schematically illustrating an example of a low beam distribution state of the headlamps of the vehicle traveling on a bank road.

As illustrated in FIGS. 5A and 5B, when the vehicle C1 has tilted rearward and toward either the left or right direction in a low beam distribution state, the lamp control part 42 turns on the first light emitting part 11 and turns on, of the plurality of light emitting parts 13a of the third light emitting part 13, at least one light emitting part 13a on the side tilted downward. In this case, the end portion light emitting parts 12b of the second light emitting part 12 are kept in a state of being off. In addition, of the plurality of light emitting parts 13a, at least one light emitting part 13a on the side tilted upward is kept in a state of being off. The illumination areas A31 illuminated by the light emitting parts 13a cover, of the entire area ahead of the vehicle C1, an area not covered by the illumination area A1 of the first light emitting part 11 due to the left-right direction tilt of the vehicle C1 (in this case, illumination areas A31 on the left side corresponding to the lower side and covering the vicinity of the parallel line HL).

When the vehicle C1 has tilted forward and toward either the left or right direction in a low beam distribution state, the lamp control part 42 turns on the first light emitting part 11 and turns on, of the end portion light emitting parts 12b of the second light emitting part 12, the one on the side tilted downward. In this case, the other of the end portion light emitting parts 12b, which is on the side tilted upward, is kept in a state of being off. The plurality of light emitting parts 13a of the third light emitting part 13 are kept in a state of being off.

The lamp control part 42 determines that the vehicle C1 has not tilted in the left-right directions when the result of the detection by the tilt detection part 34 (magnitude of the angle of tilt toward the left or right direction) is less than a value predetermined for left-right directions, and determines that the vehicle C1 has tilted toward either the left or right direction when the result of the detection by the tilt detection part 34 (magnitude of the angle of tilt toward the left or right direction) is greater than or equal to the value predetermined for left-right directions. The lamp control part 42 determines that the vehicle C1 has not tilted in front-rear directions when the result of the detection by the tilt detection part 34 (magnitude of the angle of tilt toward the front or rear direction) is less than a value predetermined for front-rear directions, and determines that the vehicle C1 has tilted toward either the front or rear direction when the result of the detection by the tilt detection part 34 (magnitude of the angle of tilt toward the front or rear direction) is greater than or equal to the value predetermined for front-rear directions. Note that the predetermined values predetermined for front-rear directions may differ between the predetermined value for the forward tilt and the predetermined value for the rearward tilt.

<Operation Example>

Next, a description will be given of an example of the operation of the headlamp control system 1A of the first embodiment according to the present invention, with reference to the flowchart illustrated in FIG. 6.

In step S1, the lamp control part 42 determines whether the vehicle C1 is traveling on a bank road (here, an uphill road) (whether the vehicle is traveling on a straight road), on the basis of the results of the detections by the vehicle speed detection part 32, the steering angle detection part 33, and the tilt detection part 34. The lamp control part 42 determines that the vehicle C1 is traveling on a bank road in an uphill road when the magnitude of the angle of tilt toward the rear, detected by the tilt detection part 34, is large, the magnitude of the angle of tilt toward the left or the right, detected by the tilt detection part 34, is large, and the results of the detections by the vehicle speed detection part 32 and the steering angle detection part 33 satisfies predetermined criteria. The predetermined criteria (predetermined values) for the results of detections by the vehicle speed detection part 32 and the steering angle detection part 33 may be represented by values that vary in a manner depending on the detection results (magnitude of the angle of tilt toward the left or the right) of the detection by the tilt detection part 34. For example, even when the value of the detection result (magnitude of the angle of tilt toward the left or the right), detected by the tilt detection part 34, is large, when at least one of the results of detections by the vehicle speed detection part 32 and the steering angle detection part 33 is less than a corresponding predetermined value, the vehicle C1 is in a state of simply tilting toward either the left or right direction. In such a case, the lamp control part 42 determines that the vehicle C1 is not traveling on a bank road (determines that the vehicle C1 is traveling on a straight road).

When the result of step S1 is Yes, in step S2, the lamp control part 42 determines which light emitting parts 13a, of the plurality of light emitting parts 13a of the third light emitting part 13, should be turned on, on the basis of the detection results of the vehicle speed detection part 32, the steering angle detection part 33, and the tilt detection part 34. Here, when the mobile object detection part 41 detects a vehicle (opposing vehicle) C2 traveling on an opposing lane as a mobile object, the lamp control part 42 determines that the light emitting parts 13a that, when turned on, illuminate the area where the vehicle C2 is present should not be turned on. Subsequently, in step S3, the lamp control part 42 turns on the light emitting parts 13a that are determined as those that should be turned on.

A headlamp control system 1A of the first embodiment according to the present invention includes: a headlamp 10A configured to emit light toward a forward direction of the vehicle C1, a tilt detection part 34 configured to detect a tilt of the vehicle C1 toward a left direction and a tilt of the vehicle C1 toward a right direction, and a control part 40 configured to control the headlamp 10A. The headlamp 10A includes: high beam emitting parts (light emitting parts 13a of a third light emitting part 13) configured to respectively illuminate high beam areas, which are segments segmented in the left-right direction (areas A31 into which an illumination area A3 is segmented), and a low beam emitting part (first light emitting part 11) configured to illuminate a low beam area (illumination area A1) located at a lower position than the high beam areas. The control part 40, upon detection by the tilt detection part 34 that the vehicle C1 has tilted such that one of the left and right sides of the vehicle C1 is lower than the other one of the left and right sides of the vehicle C1 in a state in which the low beam emitting part is on, turns on the high beam emitting part so as to illuminate, of the plurality of high beam areas, high beam area(s) on the one of the left and right sides of the vehicle C1.

As a result, the headlamp control system 1A improves, with a simple configuration, the visibility in a low beam distribution state in a case in which the vehicle C1 is traveling on a bank road, by utilizing the third light emitting part 13, which is a high beam emitting part.

Second Embodiment

Subsequently, a description will be given of a headlamp control system of a second embodiment according to the present invention, mainly focusing the difference from the headlamp control system 1A of the first embodiment according to the present invention. In the second embodiment, the illumination area A3 of the first embodiment is segmented into a lower illumination area A3 and an upper illumination area A4

As illustrated in FIG. 7, a headlamp control system 1B of the second embodiment according to the present invention includes headlamps 10B in place of the headlamps 10A. The headlamps 10B each further include a fourth light emitting part 14.

Figure 8:
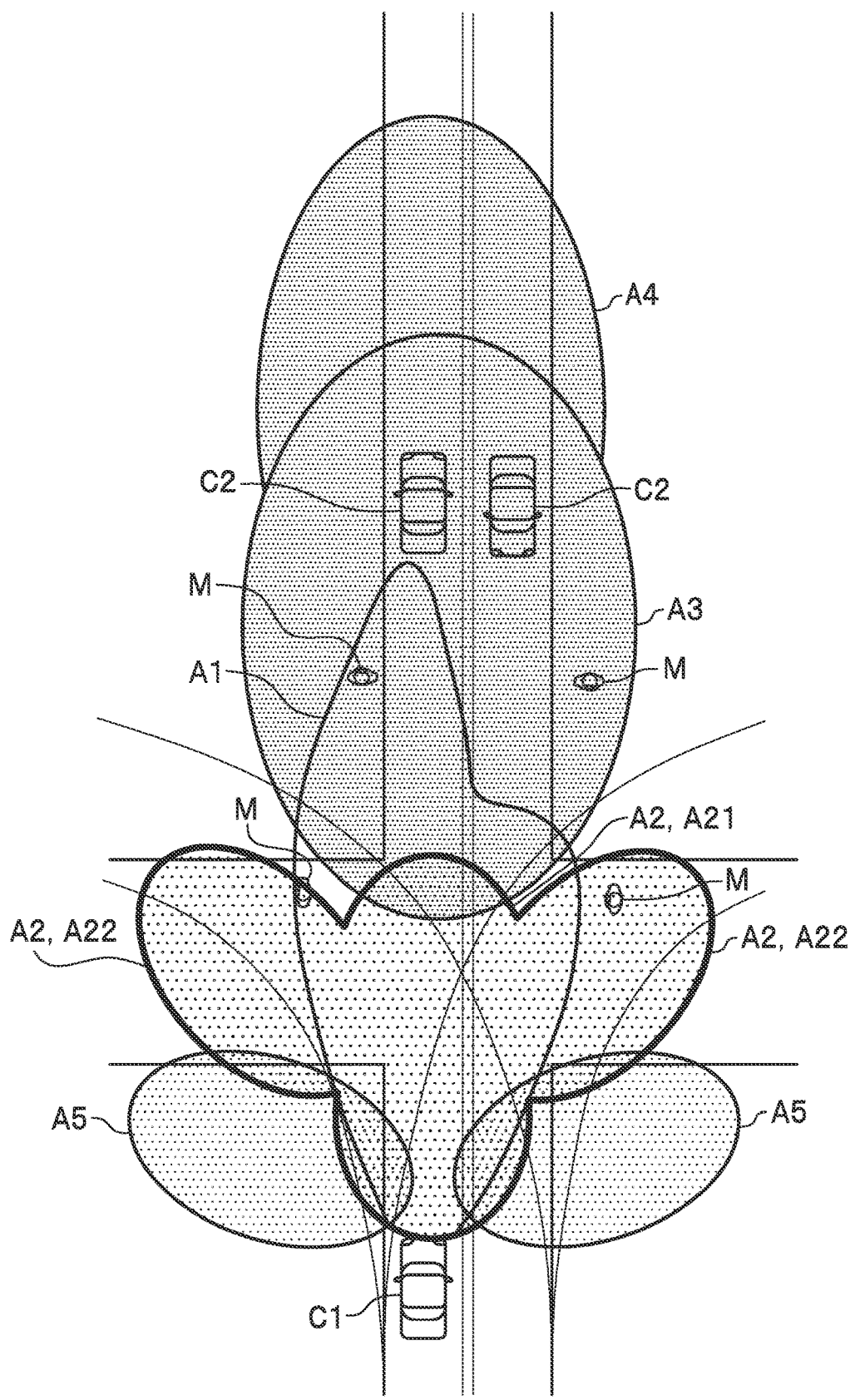
FIG. 8 is a diagram schematically illustrating an example of illumination areas illuminated by the headlamps of a vehicle to which the headlamp control system of the second embodiment according to the present invention is applied.
Figure 9:
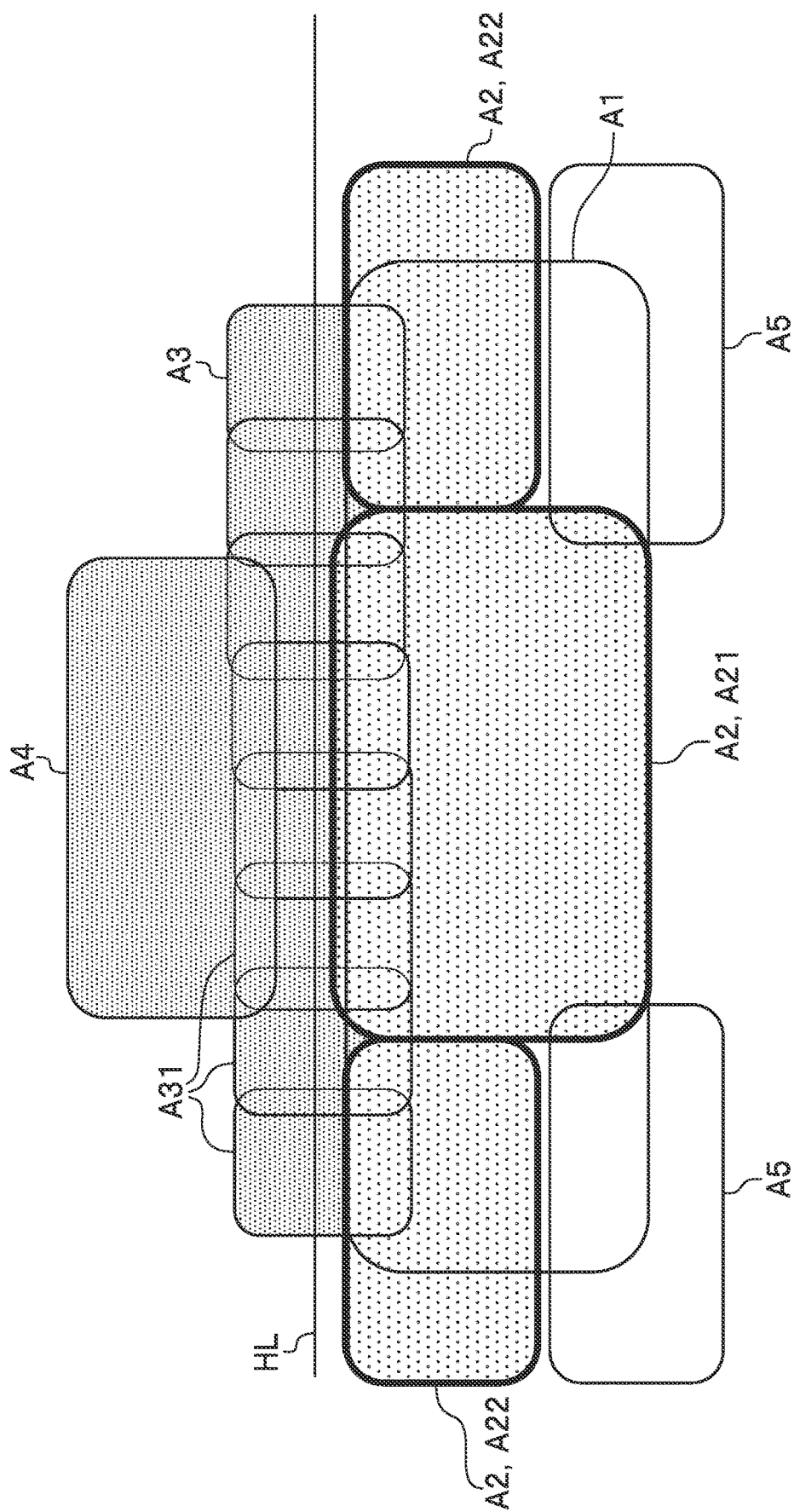
FIG. 9 is another diagram schematically illustrating an example of illumination areas illuminated by the headlamps of the vehicle to which the headlamp control system of the second embodiment according to the present invention is applied.

The fourth light emitting part 14 is a second high beam emitting part configured to emit light toward the forward direction of the vehicle C1 to an area above the parallel line HL. Specifically, the headlamp 10B is controlled to turn on the fourth light emitting part 14 to emit light as a high beam to illuminate an illumination area (fourth area (first high beam area)) A4, illustrated in FIGS. 8 and 9, located above the parallel line HL, at a higher position than the illumination area (second high beam area) A3 illuminated by the third light emitting part 13. In other words, the fourth area A4 is set at a higher position than the third area A3, i.e., set far from the vehicle C1 than the third area A3.

The lamp control part 42 is configured to, in the high beam mode, put the third light emitting part 13 and, as necessary, the fourth light emitting part 14 in a state of being on, and put the first light emitting part 11 and the second light emitting part 12 in a state of being off.

Like the first embodiment, the lamp control part 42 may be configured to determine a tilt of the vehicle C1 in a comprehensive manner on the basis of, in addition to the result of detection by the tilt detection part 34, a result of detection by an acceleration sensor provided in the vehicle C1 and a result of image capture by the front camera 31, for example.

<Low Beam Distribution Control Based on Left-Right Direction Tilt>

Hereinafter, a description will be given of low beam distribution control based on the left-right direction tilt of the vehicle C1. For that control, the lamp control part 42 controls the first light emitting part 11 and the third light emitting part 13.

Figure 10A:
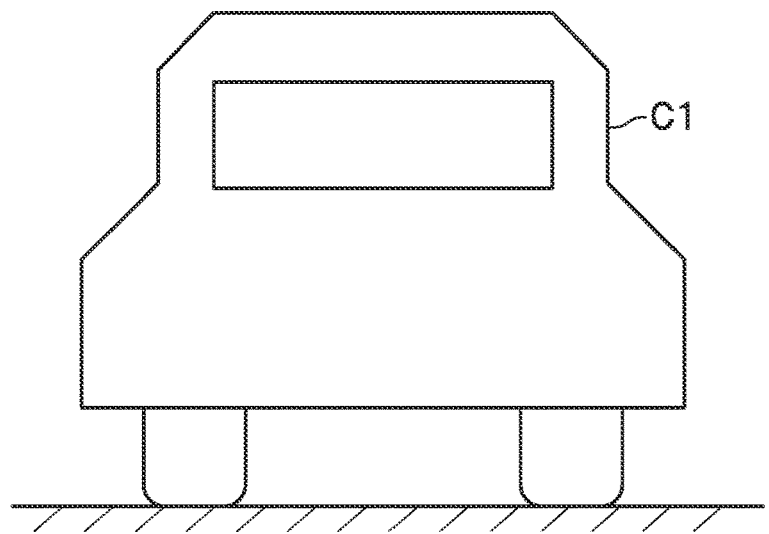
FIG. 10A is a diagram schematically illustrating a vehicle traveling on a straight road.
Figure 10B:
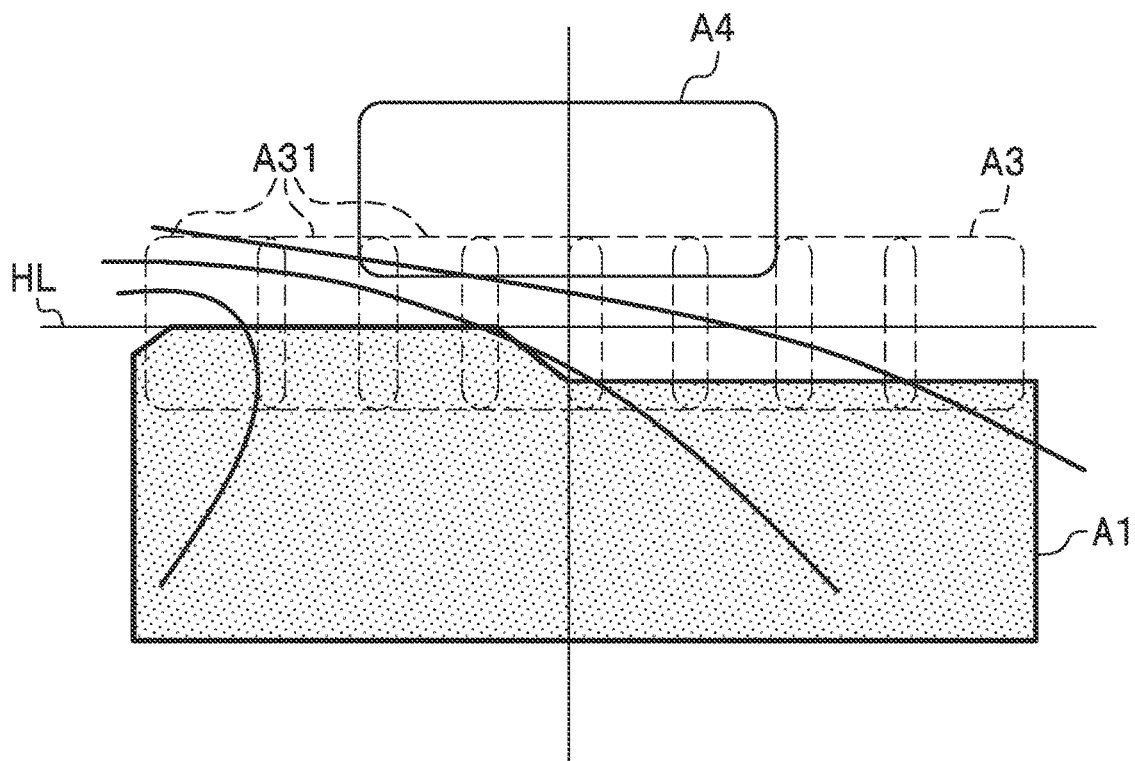
FIG. 10B is a diagram schematically illustrating a low beam distribution state of the headlamps of the vehicle traveling on a straight road.

As illustrated in FIGS. 10A and 10B, the lamp control part 42 is configured to, in a low beam distribution state, put the first light emitting part 11 in a state of being on while the vehicle C1 is not inclined in a left-right direction. In this case, the third light emitting part 13 and the fourth light emitting part 14 are kept in a state of being off.

Figure 11A:
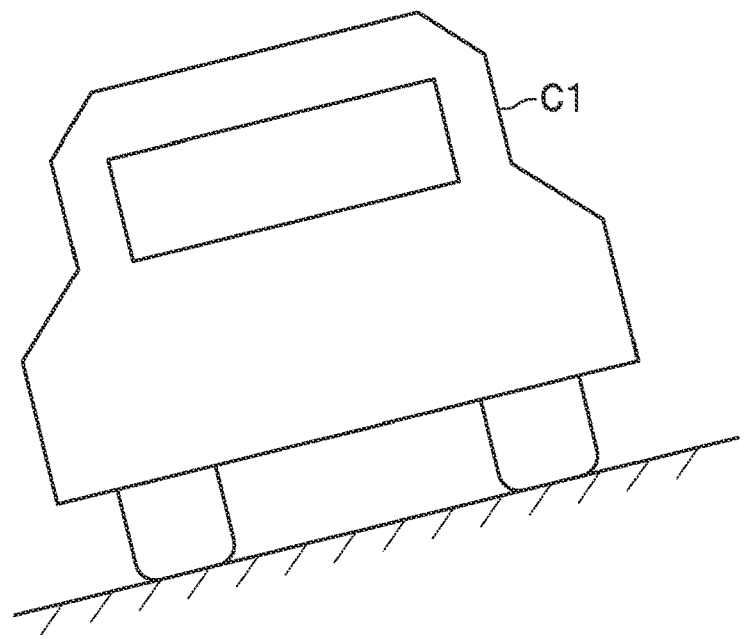
FIG. 11A is a diagram schematically illustrating a vehicle traveling on a bank road.
Figure 11B:
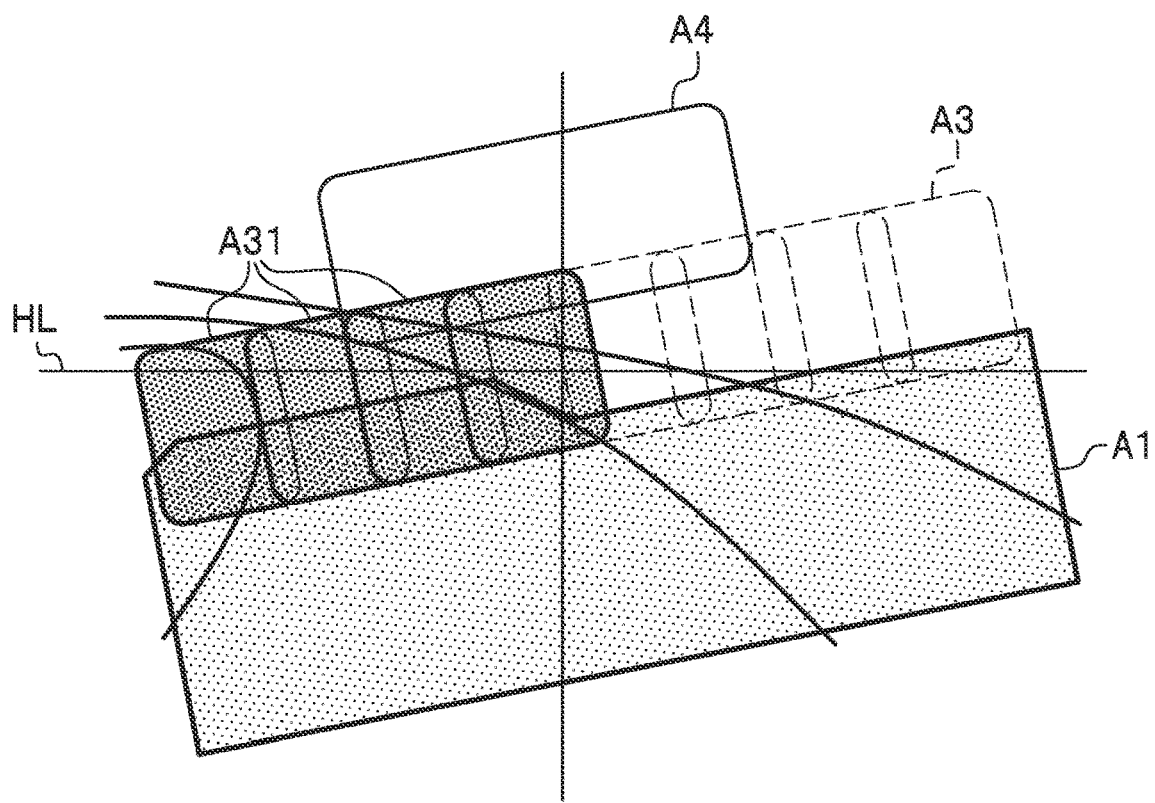
FIG. 11B is a diagram schematically illustrating a low beam distribution state of the headlamps of the vehicle traveling on a bank road.

As illustrated in FIGS. 11A and 11B, when the vehicle C1 has tilted rearward and toward either the left or right direction in a low beam distribution state, the lamp control part 42 turns on the first light emitting part 11 and turns on, of the plurality of light emitting parts 13a of the third light emitting part 13, at least one light emitting part 13a on the side tilted downward. In this case, of the plurality of light emitting parts 13a, at least one light emitting part 13a on the side tilted upward and the fourth light emitting part 14 are kept in a state of being off. The illumination areas A31 illuminated by the light emitting parts 13a turned on cover, of the entire area ahead of the vehicle C1, an area not covered by the illumination area A1 of the first light emitting part 11 due to the left-right direction tilt of the vehicle C1.

The plurality of light emitting parts 13a of the third light emitting part 13 may be configured to illuminate areas below the driver's seat of opposing vehicles C2. In such a case, when the vehicle C1 has tilted rearward and toward either the left or right direction in a low beam distribution state, the lamp control part 42 turns on the first light emitting part 11 and turns on, of the plurality of light emitting parts 13a of the third light emitting part 13, at least one light emitting part 13a located on the side tilted downward and configured to illuminate the area below the driver's seat of the vehicle C2. Specifically, for example, the lamp control part 42 turns on the four light emitting parts 13a provided from middle to the side tilted downward and turns off the four light emitting parts 13a provided from middle to the side tilted upward. In addition, the lamp control part 42 may be configured to determine that when the mobile object detection part 41 detects as a mobile object a vehicle (opposing vehicle) C2 traveling on an opposing lane, the light emitting parts 13a that, when turned on, illuminate the area where the vehicle C2 is present should not be turned on.

The lamp control part 42 may be configured to, when the vehicle C1 has tilted toward either the left or right direction but not tilted rearward in a low beam distribution state, turn on the first light emitting part 11 and turn on, of the end portion light emitting parts 12b of the second light emitting part 12, the one on the side tilted downward. In this case, the other of the end portion light emitting parts 12b, which is on the side tilted upward, is kept in a state of being off. In addition, the lamp control part 42 turns on at least one light emitting part 13a located on the side tilted downward and configured to illuminate the area below the driver's seat of the vehicle C2. In this case, the number of the light emitting parts 13a to be turned on may be smaller than the case where the vehicle C1 has tilted rearward. Specifically, for example, the lowermost two light emitting parts 13a on the side tilted downward are turned on and the other six light emitting parts 13a are turned off. Moreover, the lamp control part 42 may be configured to determine that when the mobile object detection part 41 detects as a mobile object a vehicle (opposing vehicle) C2 traveling on an opposing lane, the light emitting parts 13a that, when turned on, illuminate the area where the vehicle C2 is present should not be turned on.

A headlamp control system 1B of the second embodiment according to the present invention includes: a headlamp 10B configured to emit light toward a forward direction of the vehicle C1, a tilt detection part 34 configured to detect a tilt of the vehicle C1 toward a left direction and a tilt of the vehicle C1 toward a right direction, and a control part 40 configured to control the headlamp 10B. The headlamp 10B includes: a first high beam emitting part (fourth light emitting part 14) configured to illuminate a first high beam area (illumination area A4), and second high beam emitting parts (light emitting parts 13a of a third light emitting part 13) configured to respectively illuminate second high beam areas, which are segmented areas segmented in the left-right direction (areas A31 into which an illumination area A3 is segmented), and a low beam emitting part (first light emitting part 11) configured to illuminate a low beam area (illumination area A1) located at a lower position than the second high beam areas. The control part 40, upon detection, by the tilt detection part 34, that the vehicle C1 has tilted such that one of the left and right sides of the vehicle C1 is lower than the other one of the left and right sides of the vehicle C1 in a state in which the low beam emitting part is on, turns on at least one of the second high beam emitting parts so as to illuminate, of the plurality of second high beam areas, second high beam area(s) on the one of the left and right sides of the vehicle C1.

As a result, the headlamp control system 1B improves, with a simple configuration, the visibility in a low beam distribution state in a case in which the vehicle C1 is traveling on a bank road, by utilizing the third light emitting part 13, which is the second high beam emitting part.

In the headlamp control system 1B, the control part 40 is configured to, in a state in which low beam emitting part is on, when the tilt detection part 34 detects that the vehicle C1 has tilted such that one of the left and right sides of the vehicle C1 is lower than the other one of the left and right sides of the vehicle C1, put the first high beam emitting part in a state of being off.

As a result, in a case where the vehicle C1 is traveling on a bank road, the headlamp control system 1B reduces power consumption and keeps the anti-glare effect against opposing vehicles C2 by not turning on the fourth light emitting part 14, which is the first high beam emitting part, and improves the visibility in the low beam distribution state with a simple configuration Although certain embodiments of the present invention have been described above, it is to be understood that the present invention is not limited only to the above-described embodiments and the embodiments of the present invention can be modified as appropriate within the range not departing from the gist of the invention.

What is claimed is:

1. A headlamp control system comprising:
a headlamp configured to emit light toward a forward direction of a vehicle;
a tilt detection part configured to detect a tilt of the vehicle toward a left direction and a tilt of the vehicle toward a right direction; and
a control part configured to control the headlamp in at least one of a low beam state and a high beam state,
wherein the headlamp comprises:
high beam emitting parts configured to respectively illuminate a plurality of high beam areas into which a high beam area is segmented in a left-right direction; and
a low beam emitting part configured to illuminate a low beam area located at a lower position than the plurality of high beam areas, and
wherein the control part is configured to, in the low beam state in which a driver of the vehicle selects low beam of the headlamp and the low beam emitting part is on, when the tilt detection part detects that the vehicle has tilted such that one of a left side and a right side of the vehicle is lowered than the other one of the left side and the right side of the vehicle, control the high beam emitting parts so as to illuminate at least one high beam area of the plurality of high beam areas, the at least one high beam area being on the one of the left side and the right side of the vehicle.

2. A headlamp control system comprising:
a headlamp configured to emit light toward a forward direction of a vehicle;
a tilt detection part configured to detect a tilt of the vehicle toward a left direction and a tilt of the vehicle toward a right direction; and
a control part configured to control the headlamp in at least one of a low beam state and a high beam state,
wherein the headlamp comprises:
a first high beam emitting part configured to illuminate a first high beam area;
a second high beam emitting parts configured to respectively illuminate a plurality of second high beam areas into which a second high beam area is segmented in a left-right direction; and
a low beam emitting part configured to illuminate a low beam area located at a lower position than the second high beam areas, and
wherein the control part is configured to, in the low beam state in which a driver of the vehicle selects low beam of the headlamp and the low beam emitting part is on, when the tilt detection part detects that the vehicle has tilted such that one of a left side and a right side of the vehicle is lowered than the other one of the left side and the right side of the vehicle, control the second high beam emitting parts so as to illuminate at least one second high beam area of the plurality of second high beam areas, the at least one second high beam area being on the one of the left side and the right side of the vehicle.

3. The headlamp control system according to claim 2,
wherein the control part is further configured to, in the low beam state in which the low beam emitting part is on, when the tilt detection part detects that the vehicle has tilted such that the one of the left side and the right side of the vehicle is lowered than the other one of the left side and the right side of the vehicle, put the first high beam emitting part in a state of being off.

4. A headlamp control system comprising:
a headlamp configured to emit light toward a forward direction of a vehicle;
a tilt detection part configured to detect a tilt of the vehicle toward a left direction, a tilt of the vehicle toward a right direction, and a tilt of the vehicle toward a rear direction; and
a control part configured to control the headlamp in at least one of a low beam state and a high beam state,
wherein the headlamp comprises:
high beam emitting parts configured to respectively illuminate a plurality of high beam areas into which a high beam area is segmented in a left-right direction; and
a low beam emitting part configured to illuminate a low beam area located at a lower position than the plurality of high beam areas, and
wherein the control part is configured to, in the low beam state in which a driver of the vehicle selects low beam of the headlamp and the low beam emitting part is on, when the tilt detection part detects that the vehicle has tilted such that one of a left side and a right side of the vehicle is lowered than the other one of the left side and the right side of the vehicle and the vehicle has tilted rearward, control the high beam emitting parts so as to illuminate at least one high beam area of the plurality of high beam areas, the at least one high beam area being on the one of the left side and the right side of the vehicle.

* * * * *